United States Patent [19]

Hicks

[11] Patent Number: 5,643,284
[45] Date of Patent: Jul. 1, 1997

[54] ANIMAL EAR TAG MOUNTING MECHANISM

[76] Inventor: Donald D. Hicks, Box 321, Geraldine, Mont. 59446

[21] Appl. No.: 365,343

[22] Filed: Dec. 28, 1994

[51] Int. Cl.⁶ .................. A61B 17/00; G09F 3/00
[52] U.S. Cl. ............................ 606/117; 40/301
[58] Field of Search ..................... 606/116, 117, 606/167, 184, 185, 188, 151; 40/300, 301; 119/858

[56] References Cited

U.S. PATENT DOCUMENTS

| | | | |
|---|---|---|---|
| 495,270 | 4/1893 | Rozell | 40/301 |
| 1,159,593 | 11/1915 | Lindeberg | 40/301 |
| 1,347,868 | 7/1920 | Nichols. | |
| 2,940,199 | 6/1960 | Goldberg | 40/301 |
| 4,696,119 | 9/1987 | Howe et al. | 40/301 |
| 5,024,013 | 6/1991 | Hayes et al. | 40/301 |
| 5,152,249 | 10/1992 | Howe | 119/156 |

FOREIGN PATENT DOCUMENTS

| | | | |
|---|---|---|---|
| 15055 | of 1892 | United Kingdom | 40/301 |
| 25481 | of 1911 | United Kingdom | 40/301 |
| WO86/00498 | 1/1986 | WIPO | 40/301 |

Primary Examiner—Robert A. Hafer
Assistant Examiner—Benjamin Koo
Attorney, Agent, or Firm—Jerry Johnson

[57] ABSTRACT

A snug fitting two-piece tagging system which employs a low-grade spring function therein. The present invention provides a piercing stud coupled to a domed shaped member. The compressible domed shaped member may have an outer surface which is domed away from the piercing stud and is concavely rounded on the inner surface from which the stud emanates. Further, the compressible domed shaped piercing stud may be formed from a flexible material. In this configuration, the compressible domed shape piercing stud functions as a low-grade spring which may be slightly compressed upon installation. That is, the piercing stud base may be snug against the tagged material around the contacting perimeter, leaving no gap to snag a foreign object.

Another embodiment of the present invention allows for interruption of contact around the contacting perimeter of the compressible domed shaped member to prevent the entrapment of moisture or the like in and around the compressible domed shaped member. This embodiment may prevent necrosis under the tag element while providing the attendant advantages of the spring action discussed above.

4 Claims, 3 Drawing Sheets

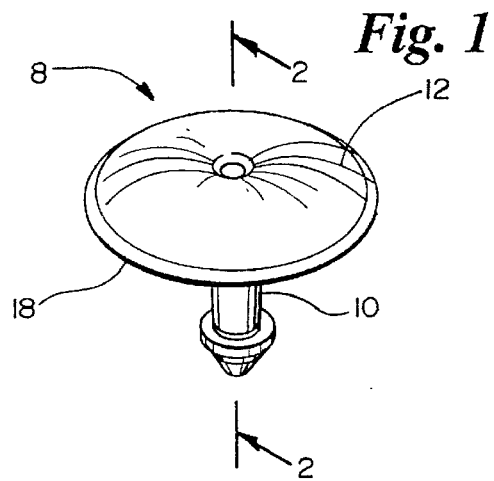
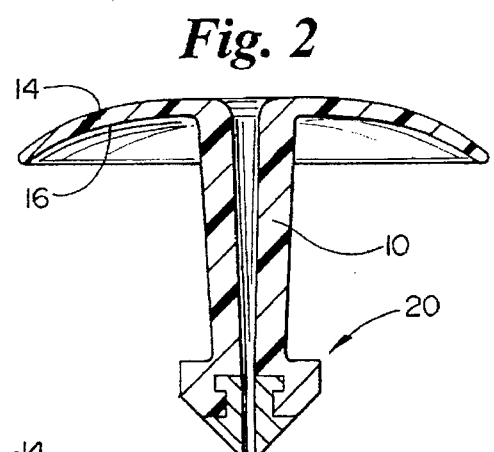
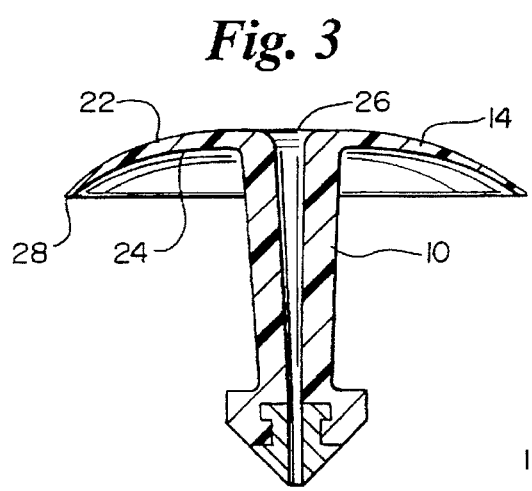
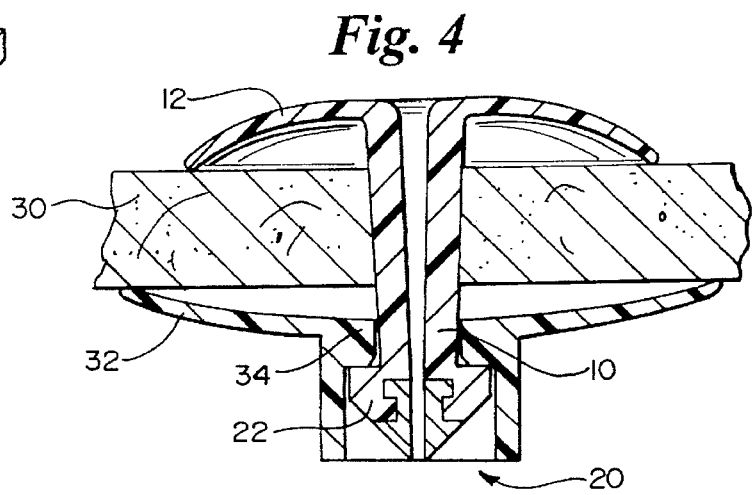

ANIMAL EAR TAG MOUNTING MECHANISM

BACKGROUND OF THE INVENTION

1. Field of the Invention

The present invention generally relates to animal ear tagging systems and more particularly relates to such systems which provide means for identification of domestic and/or wild animals.

2. Description of the Prior Art

Animal tagging systems have been used for many years to provide identification of domestic and/or wild animals. Two piece tagging systems have grown to be the most popular in recent years. Two-piece tagging systems generally comprise a piercing stud which is inserted through an animal's ear and locked into a receiving tag on the opposite side thereof. Modern two piece tagging systems provide relatively easy installation and a relatively durable tag.

Early tagging systems were generally constructed from a relatively rigid material and were loose fitting. This made the early tags susceptible to hooking or snagging on foreign objects resulting in having the tags torn from the site or mechanically broke therefrom. Because of these limitations, early two-piece tagging systems were of marginal value for purposes of furnishing a means of identification of an animal over an extended period.

Early attempts to overcome these problems, focused on utilizing shorter stud length to provide a more snug fitting tag. While these attempts reduced the chance that the tag would become snagged on a foreign object, they also resulted in a solid and unforgiving tag which applied constant pressure to the animal's ear. This often resulted in tissue necrosis at the site of installation.

Another attempt to overcome this problem is suggested in U.S. Pat. No. 1,347,868, issued on Jul. 27, 1920 to Nichols. Nichols suggests an animal ear tag which is held in place by having a tag member and a rivet member wherein both the tag member and the rivet member are dished on their inner surfaces. Nichols' suggests that the dished configuration allows the ear tag to be brought directly against the flesh of the animal while still permitting the hair under the disk to grow. A problem with Nichols is that the outer circumference of the male and female members is pressed against the tagged material in an unforgiving manner thereby limiting blood flow thereunder. Further, the shape and rigidity of the male and female members limit the degree of snugness that can be achieved while still maintaining adequate blood flow. That is, to limit the contact pressure exerted on the tagged material to acceptable levels, it may be necessary for Nichols to increase the stud length such that hooking and snagging once again become a problem.

The problems of Nichols are exacerbated when the material that is the subject of the tagging system is not guaranteed to be of a singular predetermined thickness. In Nichols, the thicker the tagged material, the more pressure the tag may apply thereto. Since any two animals' ears may rarely be the same thickness, the pressure applied to the tagging material may vary substantially from animal to animal.

A similar concept to Nichols is suggested in U.S. Pat. No. 2,940,199, issued on Jun. 14, 1960 to Goldberg. Goldberg suggests an animal tag system having a male member and a female member wherein the female member is circular flat or convex disk shaped. Goldberg suffers from the same disadvantages as Nichols.

U.S. Pat. No. 4,696,119, issued on Sept. 29, 1987 to Howe et al., suggests a tag having a plurality of air passages for permitting air flow to the area around the stem of the tag. Howe suggests ribs and troughs in the side of the ear tag to permit the air flow. A problem with Howe et al. is that the ribs and troughs are susceptible to snagging and hooking on foreign objects and thus allow the tag to be inadvertently dislodged. A further problem with Howe et al. is that the tag is rigidly constructed thereby suffering from the same limitations as Nichols and Goldberg.

SUMMARY OF THE INVENTION

The present invention overcomes many of the disadvantages of the prior art by providing a snug fitting two-piece tagging system which utilizes a low-grade spring function. This may be accomplished by providing a piercing stud that is coupled to a compressible domed shaped member. The compressible domed shaped member may have an outer surface which is domed away from the piercing stud and may be concavely rounded on the inner surface from which the stud emanates. Further, the compressible domed shaped member may be formed from an elastomeric material. By combining the dome shape with the elastomeric material, the compressible domed shape member may function as a low-grade spring which may be slightly compressed upon installation. That is, the contacting perimeter of the compressible domed shaped member may be snug against the tagged material, leaving no gap to snag on foreign objects, while still maintaining a contact pressure which is less than the blood pressure in the animal's ear. The pressure exerted on the tagged material may be adjusted by changing the "spring" characteristic of the compressible domed shaped member. It is recognized that the "domed" shape of the compressible domed shaped member referenced above is only exemplary and that other shapes may be used which provide a spring function thereto.

In an exemplary embodiment of the present invention, the pressure exerted on the tagged material may not exceed the pressure of the blood in the vessels supplying nutrients to the tagged tissue thereby helping to prevent tissue necrosis at the installation site. This may be accomplished by choosing the appropriate material and/or shape for the compressible domed shaped member and by providing an adequate area of peripheral contact to reduce contact pressure to acceptable levels.

An advantage of the present invention is that the tag may be pressed against the tagged material to prevent hooking or snagging on foreign objects while maintaining acceptable levels of pressure on the tagged material.

Another advantage of the present invention is that the "spring" function of the compressible domed shaped member is capable of accommodating a wider range of tagging material thicknesses while still maintaining acceptable levels of pressure on the tagging material. As a result, the uniformity and predictability of the pressure that is exerted on any given animal's ear is improved over prior art tagging systems.

Another embodiment of the present invention provides for slots in the compressible dome shaped member extending from the contacting perimeter inward toward the piercing stud. This embodiment allows for an extremely flexible domed shaped member whereby the pressure exerted on the ear tissue may be primarily dependent on the flexibility of the construction material and less dependent on the shape of the compressible domed shaped member itself.

Another embodiment of the present invention allows for interruption of contact around the contacting perimeter of the compressible domed shaped member to prevent the entrapment of moisture or the like in and around the compressible domed shaped member. This may help prevent necrosis under the tag element while providing the attendant advantages of the spring function discussed above.

The compression features of the compressible domed shaped member may be incorporated into the receiving half of the tag or both halves as desired. In one embodiment, both tag halves may comprise a compressible domed shaped member thereby providing an opposing force on the tagged material. The compressible domed shaped members may have the same diameters thereby providing opposing contact on the tagged material. This embodiment may be used most effectively with non-living tagged material such as leather or other materials which are not very sensitive to the opposing force exerted thereon.

In another embodiment, the opposing compressible domed shaped members may have different diameters. This embodiment is preferred for use with living tagged material. By providing different diameters, the "opposing contact" force between opposing compressible domed shaped members may be minimized. In this configuration, the flexibility of the tagged material itself can help ameliorate the opposing force.

The compressible domed shaped member may be integrally formed with a piercing stud. Conversely, the compressible domed shaped member may be fabricated as a separate member which may be used in conjunction with an industry standard piercing stud. This may furnish a means for providing the standard piercing stud with the compressibility features discussed above.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 1 is a perspective view of a first embodiment of the present invention;

FIG. 2 is a sectional view of the first embodiment shown in FIG. 1 taken along line 2—2;

FIG. 3 is a sectional view of an alternative embodiment, wherein the thickness of the compressible domed shaped member is tapered toward the contacting perimeter thereof;

FIG. 4 is a sectional view of the embodiment shown in FIGS. 1–2 having a receiving compressible domed shaped member attached thereto;

DETAILED DESCRIPTION OF THE PREFERRED EMBODIMENTS

Figure 5:
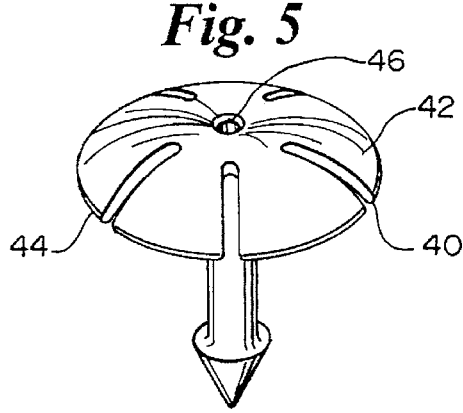
FIG. 5 is a perspective view of a second alternative embodiment of the present invention, wherein at least one slot, extending from the contacting perimeter inward toward the piercing stud base, is provided in the compressible domed shaped member.

FIG. 1 is a perspective view of a first embodiment of the present invention. FIG. 2 is a sectional view of the embodiment shown in FIG. 1 taken along line 2—2. The first embodiment is generally shown at 8 and may comprise an elongated piercing stud 10 which is attached to a compressible domed shaped member 12. The piercing stud 10 may be inserted through a tagged material and locked into a receiving tag (not shown) on the opposite side thereof.

The compressible domed shaped member may be a segment of a sphere as shown in FIG. 1. The outer circumference of the compressible domed shaped member 12 may comprise a contacting perimeter 18 which can engage the tagged material upon installation. The compressible domed shaped member 12 may have an outer surface 14 which is domed away from the piercing stud 10 and may have an inner surface 16 which is concavely rounded on an inner surface 24 from which the piercing stud 10 emanates. The piercing stud 10 may emanate from substantially the center of compressible domed shaped member 12 and extend beneath the contacting perimeter 18 thereof. By having the piercing stud 10 emanate from substantially the center of compressible domed shaped member 12, substantially even pressure may be applied via contacting perimeter 18 on the tagged material. This may help ensure that the entire contacting perimeter 18 maintains contact with the tagged material, thus minimizing any gaps therebetween to hook or snag on foreign objects.

It will be understood that the compressible domed shaped member 12 may be formed from an elastomeric material to help provide "spring" characteristics. By combining the dome shape with the elastomeric material, the compressible domed shape member 12 may function as a low-grade spring which may be slightly compressed upon installation. That is, the contacting perimeter 18 of the compressible domed shaped member 12 may be pressed against the tagged material, leaving no gaps to snag foreign objects, while still maintaining acceptable contact pressure. The pressure exerted on the tagged material may be adjusted by changing the "spring" characteristics of the compressible domed shaped member 12. It is recognized that the compressible domed shape member 12 is only exemplary and that other shapes which provide a spring function may also be used.

The spring characteristics of the compressible domed shaped member 12 may be controlled by changing the material, the thickness of the material and the profile thereof, the radius of the dome, the height of the dome, etc. Various other embodiments for adjusting the spring characteristics of the compressible domed shaped member 12 are discussed below. In the preferred embodiment shown in FIGS. 1–2, the radius of the compressible domed shaped member 12 may be in the range from 0.3" to 0.8". The thickness of the compressible domed shaped member may be uniform as shown in FIG. 2, and may be in the range from 0.03" to 0.1". It is recognized that the thickness of the compressible domed shaped member may be increased as the radius of the dome increases to maintaining similar compression characteristics. Finally, the compressible domed shaped member may be constructed from an elastomeric material having a predetermined flexibility to achieve the desired contact pressure. It is recognized that these dimensions are only exemplary and that other dimensions may be used for the compressible domed shaped member 12 and still be within the scope of the present invention.

In an exemplary embodiment of the present invention, the pressure exerted on the tagged material will not be equal to or exceed the pressure of the blood in the vessels supplying nutrients to the tagged tissue. This may be accomplished by choosing the appropriate spring characteristics referenced above for the compressible domed shaped member 12 and by providing an adequate area of peripheral contact to reduce contact pressure to acceptable levels.

Another advantage of the present invention is that the "spring" function of the compressible domed shaped member 12 is capable of accommodating a wider range of tagging material thicknesses while still maintaining acceptable levels of pressure on the tagging material. As a result, the uniformity and predictability of the pressure that is exerted on any given animal's ear is improved over the prior art tagging systems.

It is recognized that the piercing stud 10 may be attached to the compressible domed shaped member 12 or integrally formed therewith. Further, attachment means comprising locking shoulder means 20 may be provided at an end of the piercing stud 10 which is opposite the compressible domed member 12. The attachment means 20 may be attached to piercing stud 10 or integrally formed therewith. A further discussion of the attachment means 20 can be found with reference to FIG. 4.

FIG. 3 is a sectional view of a first alternative embodiment to FIG. 1. A compressible domed shaped member 14 may have an outer surface 22 which is domed away from the piercing stud 10 and may have an inner surface 24 which is concavely rounded from which the piercing stud 10 emanates. In the embodiment shown in FIG. 3, the compressible domed shaped member 14 may have a thickness which is tapered from the center 26 of the compressible domed shaped member 14 to the contacting perimeter 28. This configuration may provide increased flexibility to the compressible domed shaped member 14. The increased flexibility may reduce the pressure applied along the contacting perimeter 28 and may further ensure that the contacting perimeter can conform to irregularities on the tagged surface. This latter feature is especially important to prevent gaps between the tagged material and the contacting perimeter thereby reducing the chance that the tag will become snagged or hooked on a foreign object.

FIG. 4 is a sectional view of the embodiment shown in FIGS. 1–2 having a receiving compressible domed shaped member attached thereto. As stated above, The embodiment shown in FIGS. 1–2 may comprise an elongated piercing stud 10 that is attached to a compressible domed shaped member 12. The piercing stud 10 includes an elongated smooth shaft having a pointed end and an adjacent attaching means 20 that comprises locking shoulder means that may be inserted through a tagged material 30 and locked into a receiving tag 32 on the opposite side thereof. The compression features of the compressible domed shaped member 12 may be incorporated into the receiving member 32 of the tag or both members as desired.

In one embodiment of the present invention, both tag halves 12 and 32 may comprise a compressible domed shaped member thereby providing an opposing force on the tagged material. The compressible domed shaped members 12 and 32 may have the same diameters thereby providing opposing contact on the tagged material 30. This embodiment may be used most effectively with non-living tagged material 30 such as leather or other materials which are not very sensitive to an opposing force thereon.

In the embodiment shown in FIG. 4, the opposing compressible domed shaped members 12 and 32 may have different diameters. This embodiment is preferred for use with living tagged material 30. By having different diameters, the "opposing contact" force between opposing compressible domed shaped members 12 and 32 may be minimized because the flexibility of the tagged material 30 may help ameliorate the opposing force thereon. In this embodiment, the opposing force may be minimized while maintaining an adequate degree of snugness on the tagged material 30.

The compressible domed shaped member 12 may be integrally formed with a piercing stud 10. Conversely, the compressible domed shaped member 12 may be fabricated as a separate member which may be used in conjunction with an industry standard piercing stud 10. This may furnish means for providing the standard piercing stud 10 with the compressibility features discussed above.

Attachment means 20 may be provided at the end of the piercing stud 10 which is opposite the compressible domed member 12. The attachment means 20 may be attached to piercing stud 10 or integrally formed therewith. The attachment means 20 provides means for attaching the piercing stud 10 to the receiving member 32.

In an exemplary embodiment, the piercing stud 10 may comprise a head member 22 which may have a larger radius than the piercing stud 10 and may be oversized to pressure fit into a socket 34 of the receiving member 32. The socket 34 may have an inner diameter that is substantially the same as the outer diameter of the piercing stud 10. The barrel 34 may be constructed from a flexible material such that the walls of the barrel 34 may be deformed during the insertion of the head member 22. The lower portion of the head member 22 may be cone shaped to allow easier insertion of the head member 22 through the barrel 34. Once the head member 22 is fully inserted, the barrel 34 may embrace the piercing stud 10 and may be locked in place by the oversized head member 22 as shown in FIG. 4.

Figure 6:
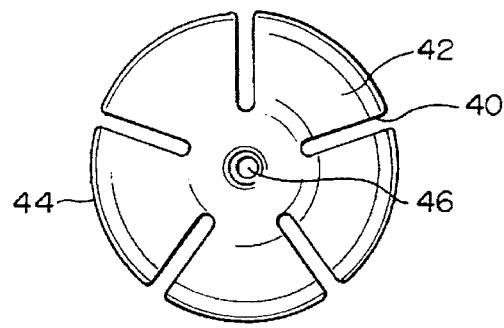
FIG. 6 is a top view of the embodiment shown in FIG. 6.

FIG. 5 is a perspective view of another embodiment of the present invention. FIG. 6 is a top view of the embodiment shown in FIG. 6. In the embodiment shown in FIGS. 5–6, at least one cutout comprising a slot 40 may be provided in a compressible domed shaped member 42 wherein each slot 40 may extend from the contacting perimeter 44 inward toward the piercing stud base 46. This embodiment allows for an extremely flexible domed shaped member 42 whereby the pressure exerted on the tagged material may be primarily dependent on the flexibility of the construction material and less dependent on the shape of the compressible domed shaped member 42.

A further advantage of providing one or more slots 40 in the compressible domed shape member 42 is that each slot 40 may allow for the interruption of contact around the contacting perimeter 44 of the compressible domed shaped member 42. This may prevent the entrapment of moisture or the like in and around the compressible domed shaped member 42. As stated above, this may help prevent infection and/or necrosis under the compressible domed shaped member 42 while providing the attendant advantages of the spring function discussed above.

Five equally spaced slots are shown as being provided wherein each slot 40 may extend approximately ⅔ of the way from the contacting perimeter 44 to the piercing stud base 46. Each slot 40 may have a slot width which is narrow enough to minimize the chance that a foreign object may become snagged or hooked thereon.

Figure 7:
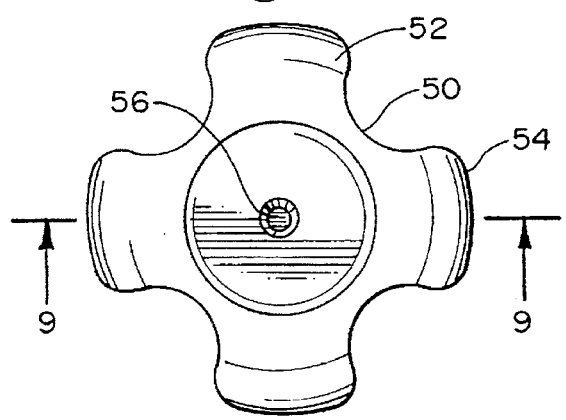
FIG. 7 is a top view of a third alternative embodiment of the present invention, wherein at least one ingress, extending from the contacting perimeter inward toward the piercing stud base, is provided in the compressible domed shaped member.
Figure 8:
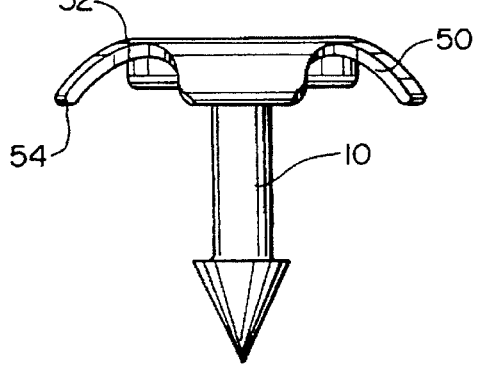
FIG. 8 is a side view of the embodiment shown in FIG. 7.

FIG. 7 is a top view of another embodiment of the present invention. FIG. 8 is a side view of the embodiment shown in FIG. 7. The embodiment shown in FIGS. 7-8 is essentially the same as that shown in FIGS. 1-4, except that at least one cutout comprising a indentation 50 is provided in the compressible domed shape member 52 extending from the contacting perimeter 54 inward toward the piercing stud base 56. This embodiment allows for an extremely flexible domed shaped member 52 whereby the pressure exerted on the tagged material may be primarily dependent on the flexibility of the construction material and less dependent on the shape of the compressible domed shaped member 52 itself.

A further advantage of providing at least one indentation 50 in the compressible domed shape member 52 is that each indentation 50 may allow for the interruption of contact around the contacting perimeter 54 of the compressible domed shaped member 52. As stated above, this may help prevent necrosis under the compressible domed shaped member 52 while providing the attendant advantages of the spring function discussed above.

In a preferred embodiment, four equally spaced indentations are provided wherein each indentation 50 may be shallow enough to minimize the chance that a foreign object may become snagged or hooked thereon.

Figure 9:
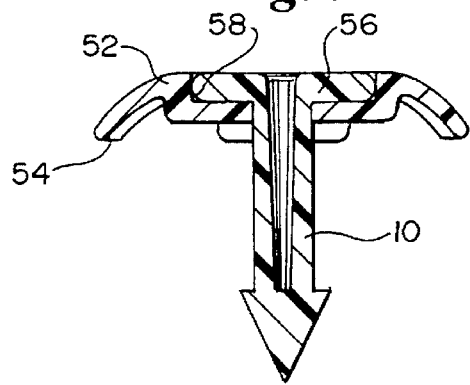
FIG. 9 is a sectional view of the embodiment shown in FIG. 7 taken along line 9—9.

FIG. 9 is a sectional view of the embodiment shown in FIG. 7 taken along line 9—9. FIG. 9 shows that the piercing stud base 56 may be received by a recess 58 in compressible domed shaped member 52. This embodiment provides a smooth transition between the compressible domed shaped member 52 and the piercing stud base 56 thereby minimizing the chance that a foreign object may become snagged or hooked thereon.

Another advantage of providing the recess 58 in compressible domed shape member 52 is that a lower profile tag may be provided. This may further minimize the chance that the tag may become snagged or hooked on a foreign object.

It is contemplated that piercing stud 10 may be an industry standard piercing stud and that the compressible domed shaped member 52 may be utilized in conjunction therewith. In this configuration, the depth of recess 58 may be dictated by the thickness of piercing stud base 56 to ensure a smooth transition therebetween.

It is recognized that industry standard piercing studs may have a fixed length. By providing a recess 58 in the compressible domed shaped member 52, the effective usable length of piercing stud 10 may be maximized. This may allow the embodiment shown in FIG. 9 to accommodate substantially the same tagged material thickness as the industry standard piercing stud.

Figure 10:
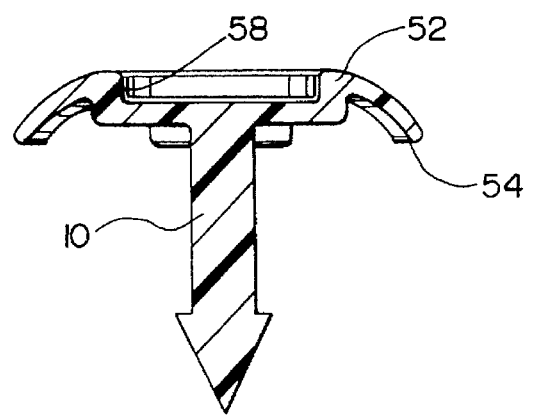
FIG. 10 is a sectional view of an alternative embodiment, wherein the piercing stud is integrally formed with the compressible domed shaped member.
Figure 11:
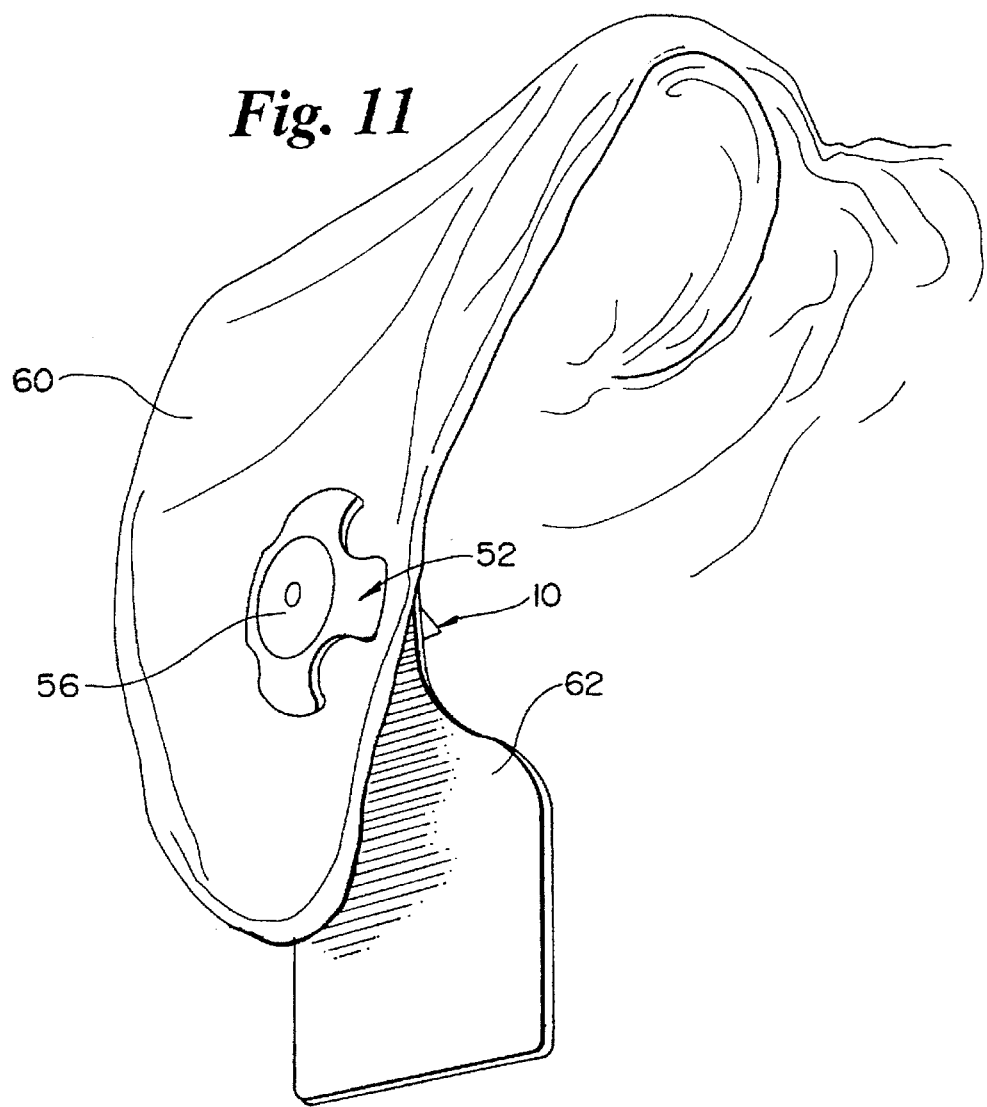
FIG. 11 is a perspective view of the embodiment shown in FIG. 9 installed on an animal's ear.

FIG. 10 is a sectional view of another embodiment wherein the piercing stud is integrally formed with the compressible domed shaped member. In this embodiment, the recess 58 is similar to that shown in FIG. 9 but a piercing stud base is not provided therein. The recess 58 affords additional flexibility to the compressible domed shaped member 52 by removing a substantial portion of material therefrom. The recess 58 may be filled with a flexible material to provide a smooth top surface to compressible domed shape member 52. The flexible material may be more flexible than the material used in forming compressible domed shaped member 52.

Having thus described the preferred embodiments of the present invention, those of skill in the art will readily appreciate that the teachings found herein may be applied to yet other embodiments within the scope of the claims hereto attached.

I claim:

1. A securing assembly for mounting an identification tag on the ear of an animal wherein the identification tag is constructed from a relatively soft and pliable plastic having an opening therein surrounded by a hollow cylindrical socket member, said securing assembly comprising:

a relatively hard plastic piercing stud having a smooth shaft, and a pointed end with locking shoulder means adapted to be inserted through the ear of an animal and received within the socket member of the tag and be locked therein by said shoulder;

a separate resilient compressible dome shaped member secured to the piercing stud opposite the pointed end, the dome shaped member including a plurality of radially disposed cutouts therein extending from the perimeter toward the central portion thereof to permit the circulation of air beneath the dome shaped member and to permit circulation of blood through the cutouts as well as between the cutouts to facilitate healing of a wound surrounding the piercing stud while maintaining resilient interrupted contact of the perimeter of the dome shaped member with the ear of an animal.

2. Apparatus according to claim 1, wherein the cutouts comprise radial slots extending from the perimeter toward the center of the compressible domed shaped member.

3. Apparatus according to claim 1, wherein the cutouts comprise indentations extending from the perimeter toward the center of the compressible domed shaped member.

4. Apparatus according to claim 1, wherein the compressible dome shaped member has a recess therein and the piercing stud has a stud base, the stud base of the piercing stud fitting into the recess of the compressible domed shaped member.

* * * * *